(12) United States Patent
Mate et al.

(10) Patent No.: US 12,219,340 B2
(45) Date of Patent: Feb. 4, 2025

(54) APPARATUS, SYSTEM, METHOD AND COMPUTER PROGRAM FOR PROVIDING SPATIAL AUDIO

(71) Applicant: Nokia Technologies Oy, Espoo (FI)

(72) Inventors: Sujeet Shyamsundar Mate, Tampere (FI); Arto Lehtiniemi, Lempaala (FI); Miikka Tapani Vilermo, Siuro (FI); Mikko-Ville Ilari Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/260,406

(22) PCT Filed: Jul. 22, 2019

(86) PCT No.: PCT/IB2019/056254
§ 371 (c)(1),
(2) Date: Jan. 14, 2021

(87) PCT Pub. No.: WO2020/021435
PCT Pub. Date: Jan. 30, 2020

(65) Prior Publication Data
US 2021/0266694 A1     Aug. 26, 2021

(30) Foreign Application Priority Data
Jul. 24, 2018   (EP) .................................... 18185311

(51) Int. Cl.
*H04M 3/56*     (2006.01)
*G10L 19/008*   (2013.01)
*H04S 3/00*     (2006.01)
*H04S 7/00*     (2006.01)

(52) U.S. Cl.
CPC ............ *H04S 7/303* (2013.01); *G10L 19/008* (2013.01); *H04M 3/568* (2013.01); *H04S 3/002* (2013.01); *H04S 7/30* (2013.01); *H04S 2400/11* (2013.01)

(58) Field of Classification Search
CPC .......................... H04M 3/568; H04S 2400/11
See application file for complete search history.

(56) References Cited

U.S. PATENT DOCUMENTS

| | | | |
|---|---|---|---|
| 2009/0303984 A1* | 12/2009 | Clark ..................... | G06N 3/006 370/352 |
| 2011/0051940 A1 | 3/2011 | Ishikawa et al. ................ | 381/22 |
| 2011/0069643 A1* | 3/2011 | Yoakum .............. | H04L 65/4015 370/261 |

(Continued)

FOREIGN PATENT DOCUMENTS

EP     3 588 988 A1     1/2020

*Primary Examiner* — Ping Lee
(74) *Attorney, Agent, or Firm* — McCarter & English, LLP

(57) ABSTRACT

Examples of the disclosure relate to apparatus, methods and computer programs. The apparatus including circuitry configured for obtaining a spatial audio signal where the spatial audio signal includes at least one participant audio object and at least one private audio object wherein the private audio object is associated with a participant which generated the participant audio object. The apparatus also includes circuitry configured for causing the participant audio object to be rendered in a first spatial location and causing the private audio object to be rendered in a second spatial location so that the rendering of the private audio object is less prominent than the rendering of the participant audio object.

20 Claims, 4 Drawing Sheets

(56) References Cited

U.S. PATENT DOCUMENTS

Figure 1:
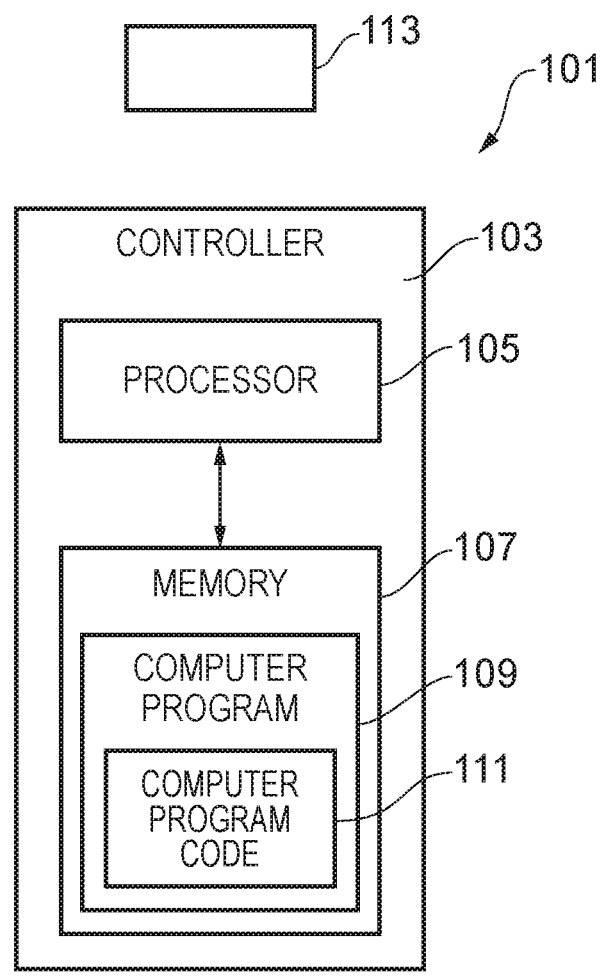

| | | | |
|---|---|---|---|
| 2013/0198657 A1* | 8/2013 | Jones | H04L 12/1822 |
| | | | 715/753 |
| 2013/0331066 A1* | 12/2013 | Burton, Jr. | G06Q 30/02 |
| | | | 455/412.1 |
| 2015/0055770 A1 | 2/2015 | Spittle et al. | 379/202.01 |

* cited by examiner

APPARATUS, SYSTEM, METHOD AND COMPUTER PROGRAM FOR PROVIDING SPATIAL AUDIO

CROSS REFERENCE TO RELATED APPLICATION

This patent application is a U.S. National Stage application of International Patent Application Number PCT/IB2019/056254 filed Jul. 22, 2019, which is hereby incorporated by reference in its entirety, and claims priority to EP 18185311.0 filed Jul. 24, 2018.

TECHNOLOGICAL FIELD

Examples of the disclosure relate to an apparatus, system, method and computer program for providing spatial audio. In some examples the apparatus, system, method and computer program may be configured for providing immersive audio experiences such as immersive audio calling.

BACKGROUND

Spatial audio systems enable an audio signal to be rendered so that a user can perceive spatial properties of the audio signal. The spatial audio system may enable an immersive audio experience such as immersive audio calling to be provided to the user. In an immersive audio system one or more audio objects may be rendered to a user so that the user perceives the audio objects to have spatial properties.

BRIEF SUMMARY

According to various, but not necessarily all, examples of the disclosure there is provided an apparatus comprising means for: obtaining a spatial audio signal where the spatial audio signal comprises at least one participant audio object and at least one private audio object wherein the private audio object is associated with a participant which generated the participant audio object; causing the participant audio object to be rendered in a first spatial location; and causing the private audio object to be rendered in a second spatial location so that the rendering of the private audio object is less prominent than the rendering of the participant audio object.

The spatial audio signal may comprise a plurality of participant audio objects and the means are configured to cause different participant audio objects to be rendered in different spatial locations.

The spatial audio signal may comprise a plurality of private audio objects associated with the same participant and the means are configured to enable the plurality of private audio objects to be rendered in different spatial locations.

The spatial location at which a private audio object is rendered may be proximate to the participant audio object with which the private audio object is associated.

The means may also be for determining a guard area relative to the first spatial location and positioning the private audio objects relative to the guard area such that the spatial locations at which the private audio objects are rendered is outside of the guard area.

The spatial locations of the audio objects may be dynamic so that the spatial locations can be updated in response to a trigger event.

The participant audio object may comprise a voice audio object.

The private audio object may comprises an audio object which is being rendered to a participant which creates the participant audio object. The private audio object may be rendered to the participant via a headset.

The apparatus is configured to enable an immersive audio call.

According to various, but not necessarily all, examples of the disclosure there is provided an apparatus comprising processing circuitry; and memory circuitry including computer program code, the memory circuitry and the computer program code configured to, with the processing circuitry, cause the apparatus to: obtain a spatial audio signal where the spatial audio signal comprises at least one participant audio object and at least one private audio object wherein the private audio object is associated with a participant which generated the participant audio object; cause the participant audio object to be rendered in a first spatial location; and cause the private audio object to be rendered in a second spatial location so that the rendering of the private audio object is less prominent than the rendering of the participant audio object.

According to various, but not necessarily all, examples of the disclosure there is provided an immersive audio system comprising an apparatus as described above and at least one participant device configured to obtain audio from a participant.

According to various, but not necessarily all, examples of the disclosure there is provided a method comprising: obtaining a spatial audio signal where the spatial audio signal comprises at least one participant audio object and at least one private audio object wherein the private audio object is associated with a participant which generated the participant audio object; causing the participant audio object to be rendered in a first spatial location; and causing the private audio object to be rendered in a second spatial location so that the rendering of the private audio object is less prominent than the rendering of the participant audio object.

The spatial audio signal may comprise a plurality of participant audio objects and the method comprises causing different participant audio objects to be rendered in different spatial locations.

According to various, but not necessarily all, examples of the disclosure there is provided a computer program comprising computer program instructions that, when executed by processing circuitry, cause: obtaining a spatial audio signal where the spatial audio signal comprises at least one participant audio object and at least one private audio object wherein the private audio object is associated with a participant which generated the participant audio object; causing the participant audio object to be rendered in a first spatial location; and causing the private audio object to be rendered in a second spatial location so that the rendering of the private audio object is less prominent than the rendering of the participant audio object.

According to various, but not necessarily all, examples of the disclosure there is provided a physical entity embodying the computer program as described above.

According to various, but not necessarily all, examples of the disclosure there is provided an electromagnetic carrier signal carrying the computer program as described above.

BRIEF DESCRIPTION

Figure 2:
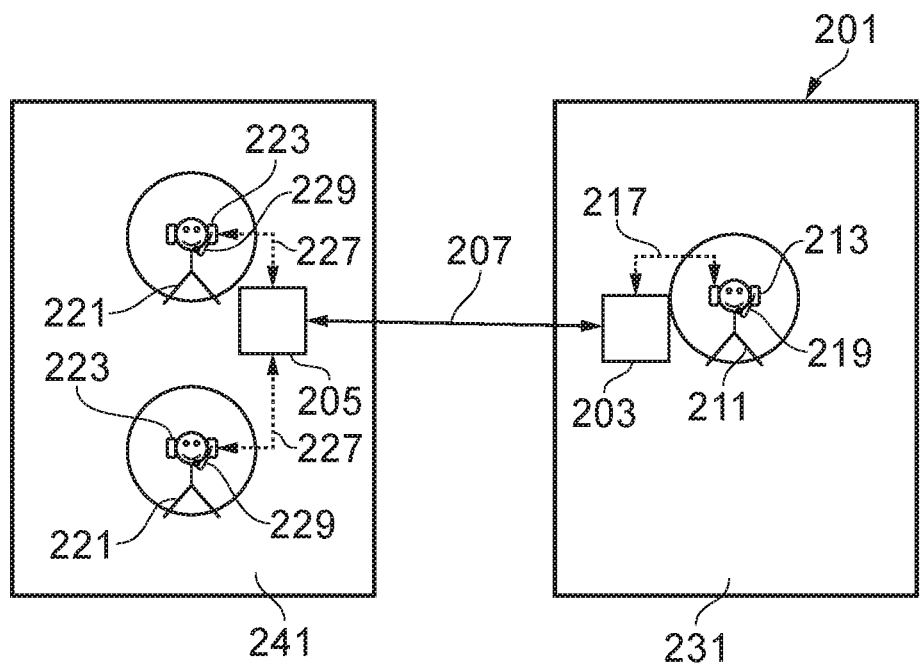
Figure 3:
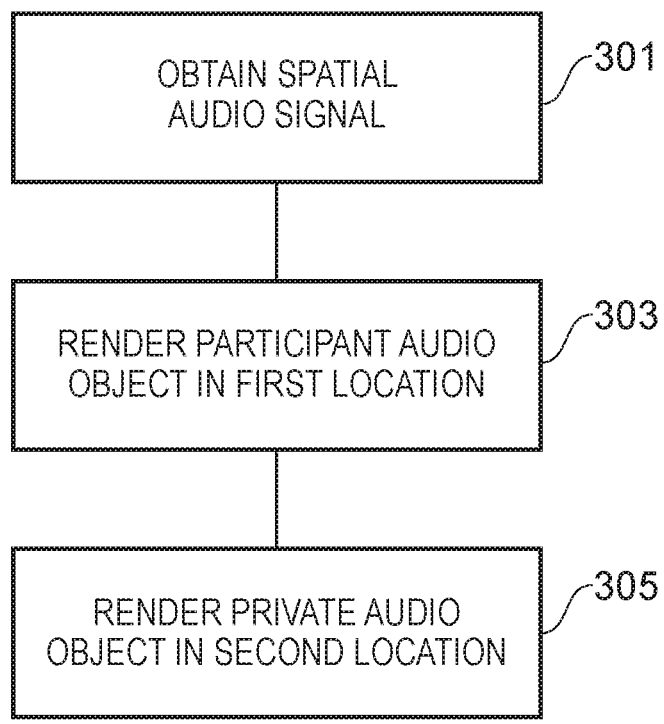
Figure 4:
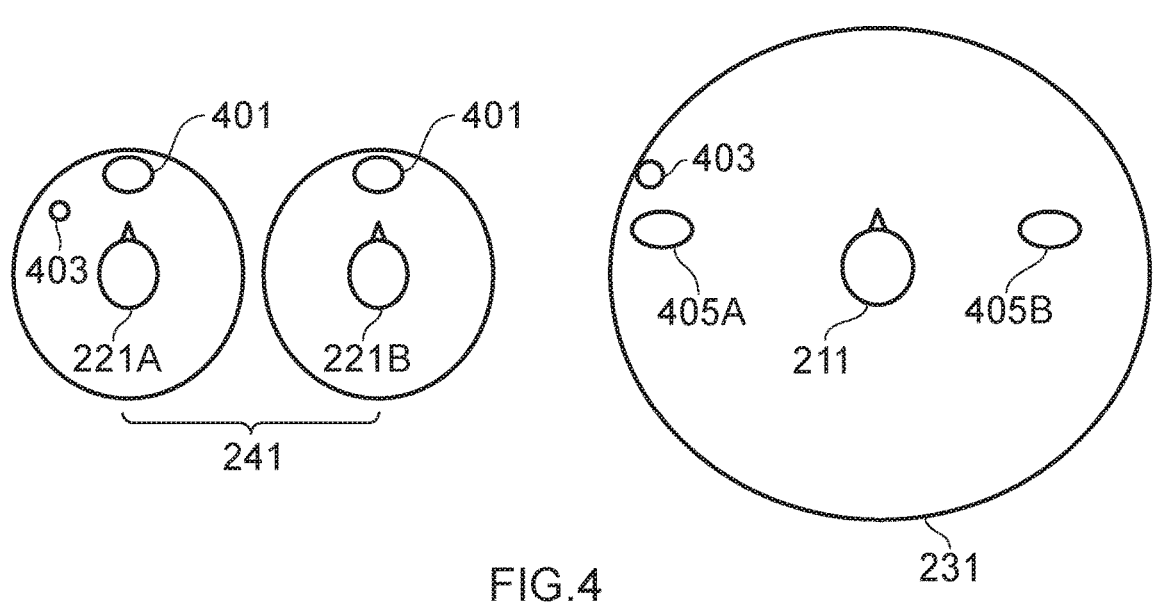
Figure 5:
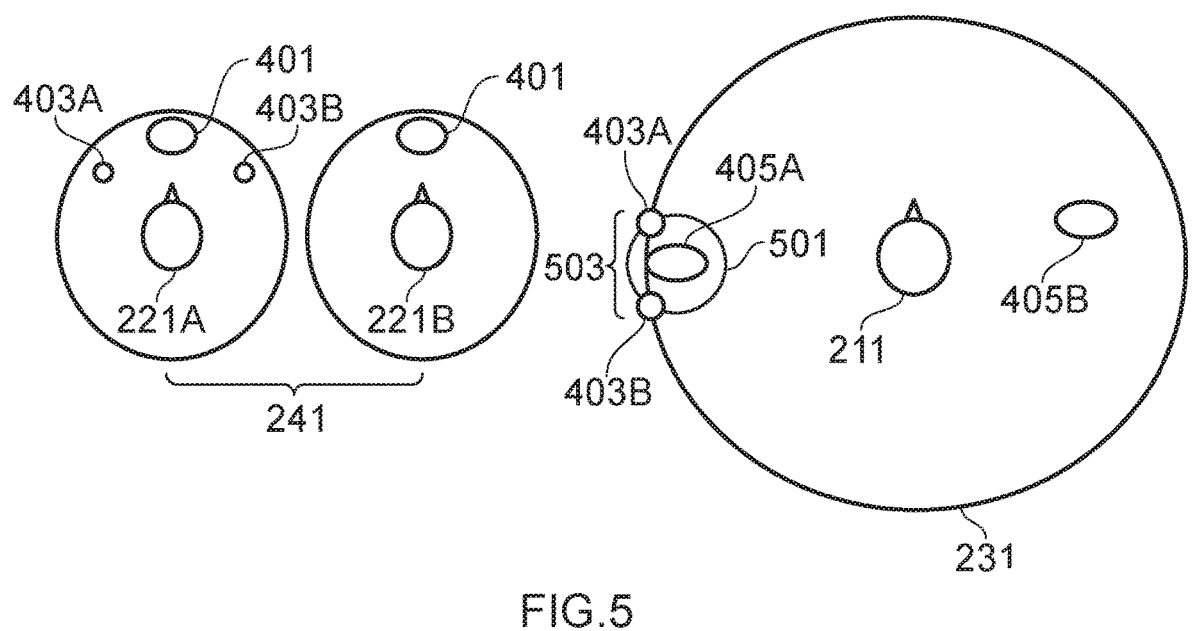
Figure 6:
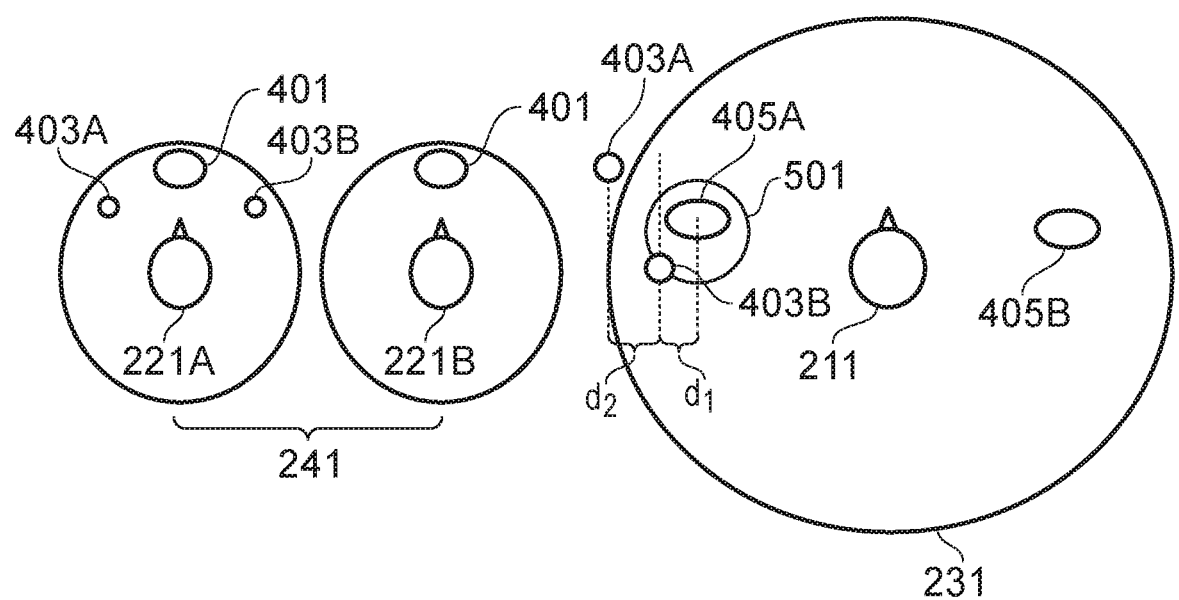

Some example embodiments will now be described with reference to the accompanying drawings in which:

FIG. 1 shows an example apparatus;
FIG. 2 shows an example system;
FIG. 3 shows an example method;

FIG. 4 shows an example implementation
FIG. 5 shows an example implementation; and
FIG. 6 shows an example implementation.

DETAILED DESCRIPTION

The Figures illustrate an apparatus 101 comprising means for: obtaining 301 a spatial audio signal where the spatial audio signal comprises at least one participant audio object and at least one private audio object wherein the private audio object is associated with a participant 221 which generated the participant audio object; causing 303 the participant audio object to be rendered in a first spatial location; and causing 305 the private audio object to be rendered in a second spatial location so that the rendering of the private audio object is less prominent than the rendering of the participant audio object.

This provides the technical effect of enabling different audio objects to be provided in different spatial locations so as to control the way they can be perceived by a user 211. This makes it easier for a user 211 listening to the audio to identify the origins and associations of the different audio objects. For example it may make it easier for the user 211 to determine which participants are associated with a private audio object. This could provide improved spatial audio systems such as immersive audio calling.

The apparatus 101 may be for providing spatial audio. In some examples the apparatus 101 may be for providing immersive audio experiences such as immersive audio calling.

FIG. 1 schematically illustrates an apparatus 101 according to examples of the disclosure. In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIG. 3. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: obtaining 301 a spatial audio signal where the spatial audio signal comprises at least one participant audio object and at least one private audio object wherein the private audio object is associated with a participant 221 which generated the participant audio object; causing 303 the participant audio object to be rendered in a first spatial location; causing 305 the private audio object to be rendered in a second spatial location so that the rendering of the private audio object is less prominent than the rendering of the participant audio object.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: obtaining 301 a spatial audio signal where the spatial audio signal comprises at least one participant audio object and at least one private audio object wherein the private audio object is associated with a participant 221 which generated the participant audio object; causing 303 the participant audio object to be rendered in a first spatial location; and causing 305 the private audio object to be rendered in a second spatial location so that the rendering of the private audio object is less prominent than the rendering of the participant audio object.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device. FIG. 2 shows an example system 201 that could be used to implement examples of the disclosure. The example system 201 could be an immersive audio system. The immersive audio system could enable immersive audio calls, virtual or augmented reality or other types of immersive audio. The immersive audio system may enable audio signals to be rendered to a user 211 so that the user 211 perceives spatial properties of the audio objects. The spatial properties could comprise the location, direction, distance, reverberation, diffusivity and other similar properties of the audio objects.

The system 201 comprises at least one user device 203, at least one participant device 205 and a communication link 207 between the user device 203 and the participant device 205. The user device 203 is the device that is being used by the user 211 to listen to audio. The participant devices 205 can be any devices that are used by participants other than the user 211 to generate audio. The participant devices 205 can also be used to enable the participants to listen to audio that is generated by the user 211. The user device 203 and the participant device 205 may be structurally similar and may perform similar functions but are associated with different people that are using the system 201.

It is to be appreciated that only components referred to in the following description are shown in FIG. 2. It is to be appreciated that the system 201 could comprise additional components in some examples of the disclosure. For example the system 201 could comprise a plurality of participant devices 205 and a plurality of communication links 207.

The user device 203 may comprise any means which enables a spatial audio signal to be processed so as to enable spatial audio to be rendered for a user 211. The user device 203 may comprise an apparatus 101 as shown in FIG. 1 which may be configured to process a spatial audio signal so as to cause the spatial audio signal to be rendered with audio objects at defined spatial locations. The defined spatial locations could have a defined direction relative to the user 211. The defined spatial locations could have a defined distance relative to the user 211. Other methods of defining the spatial location of the audio objects could be used in other examples.

The spatial audio signal that is processed by the user device 203 may comprise an audio signal which can be rendered so that the user 211 can perceive spatial properties of the spatial audio signal. The spatial audio signal may comprise metadata or other data which enables the spatial properties of the audio objects in the audio signal to be recreated when the signal is rendered. For example the spatial audio signal may be rendered so that the user 211 can perceive the direction of origin of an audio object, the relative distance of an audio object or any other suitable property. The spatial audio signal may enable an immersive audio experience to be provided to the user 211. The immersive audio experience could comprise an immersive audio call, a virtual reality or augmented reality experience or any other suitable experience.

The user device 203 may be coupled to a user rendering device 213. The user rendering device 213 may comprise any means that enables the spatial audio signal to be rendered to the user 211. The rendering of the spatial audio signal may convert an electronic signal into an acoustic pressure wave which may be audible to the user 211. The user rendering device 213 could comprise a head set, earphones or any other speakers that enable spatial audio to be provided to the user 211.

In the example system 201 of FIG. 2 the user rendering device 213 is coupled to the user device 203 so as to enable the processed spatial audio signal to be provided to the user rendering device 213. The user rendering device 213 may be coupled to the user device 203 by a short range communication link 217. The short range communication link 217 could be a wireless communication link. The wireless communication link could use any suitable protocol such as such as Bluetooth, Bluetooth Low Energy, Bluetooth Smart, 6LoWPan ($IP_v6$ over low power personal area networks) ZigBee, ANT+, near field communication (NFC), radio frequency identification, wireless local area network (wireless LAN) or any other suitable protocol.

The user device 203 and/or the user rendering device 213 could also comprise audio capturing means which may be configured to capture and record audio generated by the user 211. For example one or more microphones 219 could be provided on a headset, or in any other suitable position, to record voice audio generated by the user 211 or any other suitable audio. The audio could then be transmitted from the user device 203 to the participant device 205.

The participant device 205 may comprise any means which enables a spatial audio signal to be processed so as to enable spatial audio to be rendered for one or more participants 221. The participants 221 may comprise other people using the system who are communicating with the user 211.

The participant device 205 may be similar to the user device 203. The participant device 205 may also comprise an apparatus 101 as shown in FIG. 1 which may be configured to process a spatial audio signal so as to cause the spatial audio signal to be rendered with audio objects at defined spatial locations. The participant device 205 may be coupled to one or more participant rendering devices 223. The participant rendering devices 223 may be similar to the user rendering device 213 and may enable immersive audio, or other spatial audio to be provided to the participants 221.

In the example of FIG. 2 the participant device 205 is coupled to two participant rendering devices 223. The participant device 205 is coupled to two participant rendering devices 223 so as to enable the processed spatial audio signal to be provided to the participant rendering devices 223. The participant rendering device 223 may be coupled to the participant device 205 by short range communication links 227. The short range communication links 227 could be a wireless communication link. The wireless communication link could use any suitable protocol such as such as Bluetooth, Bluetooth Low Energy, Bluetooth Smart, 6LoW-Pan (IP$_v$6 over low power personal area networks) ZigBee, ANT+, near field communication (NFC), radio frequency identification, wireless local area network (wireless LAN) or any other suitable protocol. This coupling enables the audio from the user device 203 to be provided to two different participants 221.

In the example system 201 of FIG. 2 two different participants 221 are using the same participant device 205 but each of the participants are using different participant rendering devices 223. This enables both of the participants 221 to obtain audio via the system 201. For example it enables both of the participants 221 to obtain audio from the user 211 and participate in an audio call with the user 211. However as both of the participants have different participant rendering devices 223 this may enable additional audio to be provided to one participant 221 but not to the other participant. For example a private audio object can be rendered to one of the participants 221 via a headset or similar participant rendering device 223 while the other participant 221 does not have the private audio object rendered to them. In such examples only one of participants hears the private audio object.

The participant device 205 and/or the participant rendering devices 223 could also comprise audio capturing means which may be configured to capture and record audio generated by the participants 221. For example one or more microphones 229 could be provided on a headset, or in any other suitable position, to record voice audio generated by the participants 221 or any other suitable audio. The audio could then be transmitted from the participant device 205 to the user device 203.

The system 201 also comprises a communication link 207. The communication link 207 may comprise any means which enables data to be transmitted between the user device 203 and the participant device 205. The communication link 207 may comprise a wired and/or wireless communication link. The communication link 207 could be a long range communication link 207. The communication link 207 could comprise a cellular communication link, an internet connection and/or any other suitable type of communication link.

The communication link 207 enables the user 211 and the participants 221 to be located at different locations while using the system 201. In the example system 201 of FIG. 2 the user 211 is located at a first location 231 and the participants 221 are located at a second different location 241. The different locations 231, 241 could be different rooms, different buildings, different cities or any other different locations.

In the example of FIG. 2 the two participants 221 are located at the same location 241. For instance they are located in the same room. This enables the two participants 221 to share the participant device 205 and use the same participant device 205 to listen to audio from the user 211. However one of the participants 221 may wish to listen to additional audio. For example one of the participants may listen to a private audio object through their headset or other participant rendering device 223. The example system 201 could enable this private audio object to also be rendered to the user 211 in the different location 231. The system 201 can enable the private audio object to be rendered to the user 211 without also rendering the private audio object to the other participant 221. In such examples the participant device 205 may be configured to obtain both audio generated by the participants 221, such as voice audio, and also the private audio objects that are being rendered to a subset of the participants 221.

It is to be appreciated that the system shown in FIG. 2 is an example system and other variations of the system could be used in other examples. For instance, in the example of FIG. 2 the user device 203 and the user rendering device 213 are shown as separate devices that are connected via a wireless communication link. In other examples they could be part of the same device.

FIG. 3 shows an example method. The method could be implemented using the apparatus 101 and systems 201 shown in FIGS. 1 and 2. It is to be appreciated that other example apparatus 101 and systems 201 could be used in other implementations.

The method comprises, at block 301 obtaining a spatial audio signal where the spatial audio signal comprises at least one participant audio object and at least one private audio object. For example the user device 203 could obtain a spatial audio signal from the participant device 205 via the communication link 207.

The spatial audio signal may comprise one or more participant audio objects. The participant audio object could comprise any audio objects that are generated by the participants 221 that are using the participant device 205. The participant audio objects could comprise audio that is captured by the microphones 229 positioned near to the participants 221. For example the participant audio object could comprise voice audio objects.

In the example system 201 shown in FIG. 2 there are two participants 221 using the participant device 205. In this example a different participant audio object may be generated for each of the participants 221. In such examples the spatial audio signal would comprise a first participant audio object associated with the first participant and a second, different participant audio object associated with the second participant.

The spatial audio signal may comprise information which enables the different participant audio objects to be rendered at different spatial locations. For example a first participant audio object could be rendered at a first direction relative to the user 211 and a second participant audio object could be rendered at a second direction relative to the user 211. This may enable the user 211 to distinguish between the different participants based on the different spatial locations of the participant audio objects.

In some examples the locations of the participant audio objects could correspond to the real locations of the participants 221. In such examples the spatial rendering could recreate, or partially recreate, the relative spatial locations of the participants 221. As an example, if a first participant 221 is located on a right side of a room and a second participant 221 is located on a left side of the room the participant audio object corresponding to the first participant 221 could be rendered to the right hand side of a user 211 while the participant audio object corresponding to the second participant 221 could be rendered to the left hand side of the user 211. In such examples the right and left sides of the room could be determined with respect to the right and left sides of the participant device. In other examples other mappings between the sides of the room and the sides of the participant device could be used. For instance, the right and left sides could be based on predetermined directions in the room and/or tracking of the user location.

In other examples the locations of the participant audio objects could be determined by other factors. For instance, a user 211 could select how they wish to spatially arrange the different participants. A user 211 could have preferred spatial locations for the different participants. In some examples the participants 221 could be located in different rooms to each other. In such examples the relative spatial locations of the participant audio objects could be determined by the order in which the participants 221 joined the audio call, a priority ranking or any other suitable criteria.

The spatial audio signal also comprises at least one private audio object. The private audio object is associated with a participant 221 which generated one of the participant audio objects. The private audio object comprises an audio object which is being rendered to a participant 221 who generates the participant audio object. The private audio object could be rendered via a participant rendering device 223 or any other suitable means. The private audio object could be rendered to the participant 221 so that the private audio object is only audible to the participant 221 associated with the private audio object and not to other participants 221. For example, in the system 201 of FIG. 2 the private audio object could be rendered to the first participant 221 but not to the other participant 221. In examples where more than two participants 221 are using the same participant device 205 the private audio object could be rendered to a subset of the participants 221 and not rendered to the participants 221 that are not part of the subset. In this example the private audio object could be associated with any one or more participants 221 in the subset.

The private audio object could comprise different audio to the audio generated by the user 211 and the participants 221. For example the private audio object could comprise music or other audio that could be streamed to a participant 221. The private audio object could comprise audio that is stored in a memory 107 of the participant device 205 rather than captured by the microphones 219, 229 within the system 201. For instance the private audio object could comprise audio that has been downloaded from a content provider. The content provider could be a music provider, a video provider or any other suitable type of content provider.

The private audio object could enable the participant 221 to listen to further audio objects in addition to the immersive audio experience. For example the private audio object could provide background music for the participant 221 or could provide commentary on a football match or other sporting event while the participant 221 still participates in the immersive audio call.

The method comprises, at block 303, causing the participant audio object to be rendered in a first spatial location. The first spatial location may be a first distance and angular direction relative to the user 211. The first spatial location could be determined by the position of the participant 221 in a room or by any other suitable criteria. Where the spatial audio signal comprises a plurality of participant audio objects the different participant audio objects can be rendered in different spatial locations.

The method also comprises, at block 305, causing the private audio object to be rendered in a second spatial location so that the rendering of the private audio object is less prominent than the rendering of the participant audio object. The rendering of the private audio object could be configured to be less prominent than the rendering of the participant audio object by having an increased distance from the user 211. In some examples the private audio object could be configured to be less prominent than the rendering of the participant audio object by having an angular direction relative to the user 211 which is further away from the main directions that a user 211 can hear in. In some examples the private audio object could be configured to be less prominent than the rendering of the participant audio object by having the participant audio object be positioned between the private audio object and the user 211.

In some examples the spatial location at which a private audio object is rendered is proximate to the participant audio object with which the private audio object is associated. This can enable the user 211 to determine which participant 221 the private audio object is associated with. For example, where the spatial audio signal comprises a first participant audio object and a second participant audio object and the private audio object is associated with the first participant audio object, then the second location at which the private audio object is rendered may be closer to the first participant audio object than the second participant audio object.

In some examples the method could comprise determining a guard area relative to the first spatial location. The guard area could define an area in which the location of private audio object is prohibited. In such examples the method could also comprise positioning the private audio objects relative to the guard area such that the spatial location at which a private audio object is rendered is outside of the guard area. The guard area could be used to ensure that the private audio objects are rendered in a less prominent position than the participant audio objects.

The blocks illustrated in FIG. 3 may represent steps in a method and/or sections of code in the computer program 109. The illustration of a particular order to the blocks does not necessarily imply that there is a required or preferred order for the blocks and the order and arrangement of the block may be varied. Furthermore, it may be possible for some blocks to be omitted.

FIG. 4 schematically shows an example implementation of the method of FIG. 3. FIG. 4 schematically shows the audio objects 401, 403, 405A, 405B that are rendered to each of the user 211 and participants 221 and the spatial locations of the audio objects 401, 403, 405A, 405B. The example implementation of FIG. 4 could be achieved using the system 201 shown in FIG. 2 or any other suitable system.

In the example of FIG. 4 a first participant 221A and a second participant 221B are using the system 201. The first participant 221A and the second participant 221B could be in the same location 241. For instance the first participant 221A and the second participant 221B could be in the same room. The first participant 221A and the second participant 221B could share a participant device 205 that enables data to be exchanged with a user 211. However each of the participants 221A, B may have their own participant rendering device 223 which may be coupled to the participant device 205.

The participant device 205 and the participant rendering devices 223 are configured to provide the first participant 221A with a user audio object 401 and a private audio object 403. The user audio object 401 could comprise any audio objects that are generated by the user 211 that is using the user device 203. The user audio object 401 could comprise audio that is captured by one or more microphones 219 positioned near to the user 211. For example the user audio object 401 could comprise voice audio objects from the user 211.

The user audio object 401 is spatially located in front of the first participant 221A. In the example of FIG. 4 the user audio object 401 is spatially located directly in front of the first participant 221A. In other examples the user audio object 401 could be positioned towards the front of the first participant 221A but positioned away from an axis directly in front of the first participant 221A. This may be a prominent position for an audio object. The user audio object 401 could be positioned in the most prominent spatial location that is available.

The private audio object 403 is provided to the first participant 221A in a different spatial location to the user audio object 401. In the example of FIG. 4 the private audio object 403 is positioned towards the front of the first participant 221A but positioned away from an axis directly in front of the first participant 221A. In other examples the private audio object 403 could be positioned towards the side or the rear of the first participant 221A. This may be a less prominent position than position of the user audio object 401. This causes the rendering of the private audio object to be less prominent than the rendering of the participant audio object. This may enable the private audio object 403 to be provided as background audio to the user audio object 401.

The participant device 205 and the participant rendering devices 223 are also configured to provide the second participant 221B with the user audio object 401. The user audio object 401 could be the same user audio object 401 that is provided to the first participant 221A.

In the example of FIG. 4 the user audio object 401 is spatially located in front of the second participant 221B so that the user audio object 401 is spatially located in the same relative position for each of the participants 221A, 221B. In other examples the user audio object 401 could be spatially located in different positions for the different participants 221A, 221B.

The second participant 221B is not provided with the private audio object 403. For example, the second participant 221B could find the background private audio object 403 distracting and so may select not to be provided with the private audio object 403. This means that the first participant 221A can hear the private audio object 403 but the second participant 221B cannot.

As the first participant 221A and the second participant 221B are in the same location the two participants 221A, B can hear each other without having to send data using the immersive audio system 201. In such cases there is no need for the first participant 221A to be provided with a participant audio object corresponding to the second participant 221B and conversely there is no need for the second participant 221B to be provided with a participant audio object corresponding to the second participant 221A. In other examples the first participant 221A and the second participant 221B could be located in different locations, for instance the first participant 221A and the second participant 221B could be located in different rooms. In such cases the participants 221A, B could be provided with participant audio objects corresponding to any other participants 221 using the system 201.

The user device 203 and the user rendering device 213 are configured to provide the user 211 with a plurality of participant audio objects 405 and private audio objects 403 where the private audio objects 403 are associated with participants 221 which have generated the participant audio objects 405.

In the example of FIG. 4 a first participant audio object 405A is associated with a first participant 221A and a second participant audio object 405B is associated with a second participant 221B. The first participant audio object 405A may be generated by the first participant 221A and may comprise voice audio from the first participant 221A or other suitable audio. The second participant audio object 405B may be generated by the second participant 221B and may comprise voice audio from the second participant 221B or other suitable audio.

In the example of FIG. 4 the first participant audio object 405A is rendered to a spatial location to the left hand side of the user 211 and the second participant audio object 405B is rendered to a spatial location to the right hand side of the user 211. The first and second participant audio objects 405A, B may be rendered so that they are 180 degrees apart. This is the maximum angular separation for the participant audio objects 405A, B and may make it easier for the user 211 to distinguish between the participant audio objects 405A, B based on their spatial locations. In other examples the participant audio objects 405A, B could be provided at different angular separations, for example, both of the participant audio objects 405A, B could be provided towards the front of the user 211 so that the angular separation is less than 180 degrees, or the participant audio objects 405A, B could be provided at any other suitable position.

The private audio object 403 is also provided to the user 211. The private audio object 403 is provided in a different spatial location to the participant audio objects 405A, B. The private audio object 403 is provided in a spatial location which is less prominent than the spatial location in which the participant audio objects 405A, B are rendered. In the example of FIG. 4 the rendering of the private audio object 403 is less prominent because it is further away from the user 211, it is positioned away from an axis in line with the user's ears and it has the first participant audio object 405A positioned between the private audio object 403 and the user 211. Other methods of locating the private audio object 403 in a position so that it is rendered less prominently could be used in other examples of the disclosure.

In the example of FIG. 4 the private audio object 403 is rendered in a spatial location which is proximate to the location in which the first audio object 405A is rendered. The private audio object 403 is rendered closer to the first participant audio object 405A than the second participant audio object 405B. This may enable the user 211 to determine the participant 221A, 221B that is associated with the private audio object 403 from the relative spatial locations of the private audio object 403 and the participant audio objects 405A, 405B.

In FIG. 4 the audio objects 401, 403, 405A, 405B are shown in fixed positions. It is to be appreciated that in examples of the disclosure the spatial locations of the audio objects 401, 403, 405A, 405B could be dynamic so that the spatial locations can be updated in response to a trigger event. The trigger event could be a change in the participants 221 using the system 201, for example it could be a new participant 221 joining the system 201 or an existing participant 221 leaving the system 201. In some examples the trigger event could be one or more of the participants 221 moving, for instance the participants 221 within the same room could switch positions or make other changes in their relative locations. In some examples the trigger event could be a participant 221 initiating a new private audio object 403 or terminating the rendering of an existing private audio object 403. In other examples the trigger event could be any other changes in the setup of the immersive audio system 201.

FIG. 5 schematically shows another example implementation of the method of FIG. 3. The implementation shown in FIG. 5 is similar to the implementation in FIG. 4 except that in the example shown in FIG. 5 the first participant 221A is listening to two different private audio objects 403A, 403B. For example the first participant 221A could be listening to content from two different content providers.

In the example of FIG. 5 the two different private audio objects 403A, 403B are rendered so that the first participant 221A perceives them to be at two different spatial locations. The spatial positioning of the private audio objects 403A, 403B may enable the first participant 221A to distinguish between the different private audio objects 403A, 403B based on their spatial locations. Both of the private audio objects 403A, 403B may be rendered at a spatial location which is less prominent than the location of the user audio object 401.

In the example of FIG. 5 both of the private audio objects 403A, 403B are positioned towards the front of the first participant 221A. Both of the private audio objects 403A, 403B are positioned away from an axis directly in front of the first participant 221A. In the example of FIG. 5 the private audio objects 403A, 403B are provided on different sides of an axis directly in front of the first participant 221A. The first private audio object 403A is positioned to the left hand side of the first participant 221A while the second private audio object 403B is positioned to the right hand side of the first participant 221A. It is to be appreciated that other spatial locations of the private audio objects 403A, 403B could be used in other examples of the disclosure.

As the first participant 221A is listening to two different private audio objects 403A, 403B the spatial audio signal that is obtained by the user device 203 comprises a plurality of private audio objects 403A, 403B. The user device 203 is configured to enable these plurality of private audio objects 403A, 403B to be rendered in different spatial locations. The spatial locations may be selected so that the plurality of private audio objects 403A, 403B are rendered less prominently than the participant audio objects 405A, 405B and may enable the user 211 to associate the plurality of private audio objects 403A, 403B with the correct participant 221A, 221B.

In the example of FIG. 5 both of the private audio objects 403A, 403B are associated with the first participant 221A and so both of the private audio objects 403A, 403B are rendered so that they are perceived to be spatially located proximate to the first participant audio object 405A. In the example of FIG. 5 the first private audio object 403A is spatially located to the front of the first participant audio object 405A while the second private audio object 403B is spatially located to the rear of the first participant audio object 405A. It is to be appreciated that other spatial arrangements could be used in other examples of the disclosure.

In order to ensure that the private audio objects 403A, 403B are rendered in a spatial location that is less prominent to the user 211 than the participant audio objects 405A, 405B a guard area 501 may be defined. The guard area 501 could comprise area that is considered to have a higher prominence than the participant audio objects 405A, 405B. The rendering of the private audio objects 403A, 403B could be controlled so that the spatial positioning of any of the private audio objects 403A, 403B within the guard area 501 is prohibited. This causes the private audio objects 403A, 403B to be rendered in an area 503 outside of the guard area 501.

The guard area 501 could cover any region which could have a higher prominence than the participant audio objects 405A, 405B. In the example of FIG. 5 the guard area 501 comprises an arc between the first participant audio object 405A and the user 211. The arc has an angular range of 180 degrees or substantially 180 degrees. Other shapes of the guard area 501 could be used in other examples of the disclosure. For instance, the guard area 501 could comprise a line between the user 211 and the first participant audio object 405A. This could prevent the private audio objects 403 from being spatially located closer to the user 211 than the first participant audio object 405A is.

In the example of FIG. 5 both of the private audio objects 403A, 403B are associated with the same participant 221A. In this case both of the private audio objects 403A, 403B are rendered for the user 211 so that the user 211 perceives that both of the private audio objects 403A, 403B are associated with the first participant audio object 405A.

In other examples one or more of the private audio objects 403A, 403B could be associated with the second participant 221B. For example a first private audio object 403A, could be associated with the first participant 221A and a second private audio object 403B could be associated with the second participant 221B. In such cases the first private audio object 403A could be rendered for the user 211 so that it is proximate to the first participant audio object 405A and the second private audio object 403B could be rendered for the user 211 so that it is proximate to the second participant audio object 405B. It is to be appreciated that other numbers and arrangements of participants 221 and private audio objects 403 could be used in other implementations of the disclosure. In examples where the private audio objects 403 are associated with different participants different guard areas 501 may be defined for the different participant audio objects 405A, 405B.

FIG. 6 schematically shows another example implementation of the method of FIG. 3. The implementation shown in FIG. 6 is similar to the implementation in FIG. 5 except that in the example of FIG. 6 one of the private audio objects 403 that the first participant is listening to is louder than the other private audio object 403. In the example of FIG. 6 the first private audio object 403A is louder than the second audio object 403B.

In the example of FIG. 6, when the spatial audio signal is being rendered for the user 211 the private audio objects 403A, 403B are spatially located so as to control the relative volumes for the user 211. For instance, the louder private audio object 403 is spatially located so that it is further away from the user 211 than the quieter private audio object 403 is. In the example of FIG. 6 the second private audio object 403B is the quieter private audio object 403. This is spatially located at a distance $d_1$ from the first participant audio object 405A. The first private audio object 403A, which is the louder private audio object 403 is spatially located at a distance $d_1+d_2$ from the first participant audio object 405A. The distance $d_1+d_2$ is greater than the distance $d_1$.

The relative distances between the private audio objects 403A, B and the associated participant audio object 405A may be selected so as to control the relative volume levels for the user 211. In some examples the distances may be selected so that the first private audio object 403A and the second private audio object 403B are perceived to have the same, or substantially the same, volume levels.

In some examples the relative distances between the private audio objects 403 and the participant audio objects 405 may be selected so that one of the private audio objects 403 is perceived to be louder by the user 211. For instance the user 211 could indicate that they would like one of the private audio objects 403 to have a higher rendering volume than the other private audio objects 403. In this case the private audio object 403 that the user 211 has selected to be louder could be spatially located closer to the associated participant audio object 405A and/or the user 211.

Example of the disclosure provide for an immersive audio system 201 which enables both private audio objects and participant audio objects to be transmitted to a user 211. The different types of audio objects can be spatially rendered so that user 211 can distinguish between the different types of audio objects based on the perceived spatial positions of the rendered audio objects. This can provided for an improved immersive audio system 201.

In this description the term coupled means operationally coupled and any number or combination of intervening elements can exist between coupled components including no intervening elements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Explicitly indicate that features from different embodiments (e.g. different methods with different flow charts) can be combined, to Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one non-transitory memory storing instructions that, when executed by the at least one processor, cause the apparatus at least to:
   obtain a spatial audio signal, where the spatial audio signal comprises, at least, at least one participant audio object and at least one private audio object, wherein the at least one participant audio object is generated by a participant, and the at least one private audio object is associated with the participant, wherein the at least one private audio object is configured to be rendered to, at least, the participant and a user in a communication call comprising audio, wherein the at least one private audio object is not configured to be rendered to at least one further participant in the communication call, wherein the at least one participant audio object is configured to be rendered to, at least, the user and the at least one further participant in the communication call;
   cause the at least one participant audio object to be rendered, to the user, in a first spatial location corresponding to the participant; and
   cause the at least one private audio object to be rendered, to the user, in a second spatial location corresponding to the participant so that the rendering of the at least one private audio object is less prominent than the rendering of the at least one participant audio object such that the user can distinguish that a type of the at least one participant audio object is different from a type of the at least one private audio object, wherein the type of the at least one participant audio object comprises an audio object configured to be rendered to a plurality of participants in the communication call, wherein the type of the at least one private audio object comprises an audio object configured to be rendered to a subset of the plurality of participants in the communication call, wherein the subset of participants is at least partially different from the plurality of participants, wherein the first spatial location is at least partially different from the second spatial location, wherein a spatial relationship between the first spatial location and the second spatial location is configured to indicate that the at least one private audio object is associated with the participant.

2. An apparatus as claimed in claim 1 wherein the spatial audio signal comprises a plurality of participant audio objects, wherein the at least one memory stores instructions that, when executed by the at least one processor, cause the apparatus to:
cause different participant audio objects of the plurality of participant audio objects to be rendered in different spatial locations.

3. An apparatus as claimed in claim 1 wherein the spatial audio signal comprises a plurality of private audio objects associated with a same participant, wherein the at least one memory stores instructions that, when executed by the at least one processor, cause the apparatus to:
enable the plurality of private audio objects to be rendered in different spatial locations.

4. An apparatus as claimed in claim 1 wherein the second spatial location at which the at least one private audio object is rendered is closer to the first spatial location than to a location at which another participant audio object is rendered.

5. An apparatus as claimed in claim 1 wherein the at least one memory stores instructions that, when executed by the at least one processor, cause the apparatus to:
determine a guard area relative to the first spatial location; and
position the at least one private audio object relative to the guard area such that the second spatial location at which the at least one private audio object is rendered is outside of the guard area.

6. An apparatus as claimed in claim 1 wherein the first and second spatial locations are dynamic so that the first and second spatial locations are configured to be updated in response to a trigger event.

7. An apparatus as claimed in claim 1 wherein the at least one participant audio object comprises a voice audio object.

8. An apparatus as claimed in claim 1 wherein the at least one private audio object comprises different audio to audio generated by the user and one or more participants.

9. An apparatus as claimed in claim 1 wherein the at least one private audio object comprises audio that has been downloaded from a content provider to which the participant is listening.

10. An apparatus as claimed in claim 1 wherein the at least one private audio object is associated with the subset of the plurality of participants and not associated with participants that are not part of the subset.

11. An apparatus as claimed in claim 1 wherein the at least one private audio object is associated with a first participant but not another participant, wherein the at least one private audio object is caused to be rendered, to the user, in the second spatial location corresponding to the participant so that the rendering of the at least one private audio object is less prominent than the rendering of the at least one participant audio object such that the user can distinguish that the type of the at least one participant audio object is different from the type of the at least one private audio object based, at least partially, on at least one of:
the second spatial location being farther from the user than the first spatial location,
an angular direction of the second spatial location from the user being farther from a main direction of the user than an angular direction of the first spatial location, or
the first spatial location being located at least partially between the user and the second spatial location.

12. An apparatus as claimed in claim 1 wherein the apparatus is configured to enable an immersive audio call, wherein the communication call comprises the immersive audio call, wherein at least the participant, the user, and the at least one further participant are part of the immersive audio call, wherein the participant, the user, and the at least one further participant are different from each other, wherein the user comprises a user of the apparatus.

13. An immersive audio system comprising an apparatus as claimed in claim 1 and at least one participant device configured to obtain audio from the participant.

14. A method comprising:
obtaining a spatial audio signal, where the spatial audio signal comprises, at least, at least one participant audio object and at least one private audio object, wherein the at least one participant audio object is generated by a participant, and the at least one private audio object is associated with the participant, wherein the at least one private audio object is configured to be rendered to, at least, the participant and a user in a communication call comprising audio, wherein the at least one private audio object is not configured to be rendered to at least one further participant in the communication call, wherein the at least one participant audio object is configured to be rendered to, at least, the user and the at least one further participant in the communication call;
causing the at least one participant audio object to be rendered, to the user, in a first spatial location corresponding to the participant; and
causing the at least one private audio object to be rendered, to the user, in a second spatial location corresponding to the participant so that the rendering of the at least one private audio object is less prominent than the rendering of the at least one participant audio object such that the user can distinguish that a type of the at least one participant audio object is different from a type of the at least one private audio object, wherein the type of the at least one participant audio object comprises an audio object configured to be rendered to a plurality of participants in the communication call, wherein the type of the at least one private audio object comprises an audio object configured to be rendered to a subset of the plurality of participants in the communication call, wherein the subset of participants is at least partially different from the plurality of participants,
wherein the first spatial location is at least partially different from the second spatial location, wherein a spatial relationship between the first spatial location and the second spatial location is configured to indicate that the at least one private audio object is associated with the participant.

15. A method as claimed in claim 14, wherein the spatial audio signal comprises a plurality of participant audio objects and the method comprises
causing different participant audio objects of the plurality of participant audio objects to be rendered in different spatial locations.

16. The method as claimed in claim 14, wherein the spatial audio signal comprises a plurality of private audio objects associated with a same participant and the circuitry are configured to enable method comprises:
enabling the plurality of private audio objects to be rendered in different spatial locations.

17. The method as claimed in 14, wherein the second spatial location at which the at least one private audio object is rendered is closer to the first spatial location than to a location at which another participant audio object is rendered.

18. The method as claimed in 14, further comprising:
determining a guard area relative to the first spatial location; and
positioning the at least one private audio object relative to the guard area such that the second spatial location at which the at least one private audio object is rendered is outside of the guard area.

19. The method as claimed in 14, wherein the first and second spatial locations are dynamic so that the first and second spatial locations are configured to be updated in response to a trigger event.

20. A non-transitory computer readable medium comprising program instructions stored thereon for performing at least the following:
obtaining a spatial audio signal, where the spatial audio signal comprises, at least, at least one participant audio object and at least one private audio object, wherein the at least one participant audio object is generated by a participant, and the at least one private audio object is associated with the participant, wherein the at least one private audio object is configured to be rendered to, at least, the participant and a user in a communication call comprising audio, wherein the at least one private audio object is not configured to be rendered to at least one further participant in the communication call, wherein the at least one participant audio object is configured to be rendered to, at least, the user and the at least one further participant in the communication call;
causing the at least one participant audio object to be rendered, to the user, in a first spatial location corresponding to the participant; and
causing the at least one private audio object to be rendered, to the user, in a second spatial location corresponding to the participant so that the rendering of the at least one private audio object is less prominent than the rendering of the at least one participant audio object such that the user can distinguish that a type of the at least one participant audio object is different from a type of the at least one private audio object, wherein the type of the at least one participant audio object comprises an audio object configured to be rendered to a plurality of participants in the communication call, wherein the type of the at least one private audio object comprises an audio object configured to be rendered to a subset of the plurality of participants in the communication call, wherein the subset of participants is at least partially different from the plurality of participants,
wherein the first spatial location is at least partially different from the second spatial location, wherein a spatial relationship between the first spatial location and the second spatial location is configured to indicate that the at least one private audio object is associated with the participant.

* * * * *